UNITED STATES PATENT OFFICE.

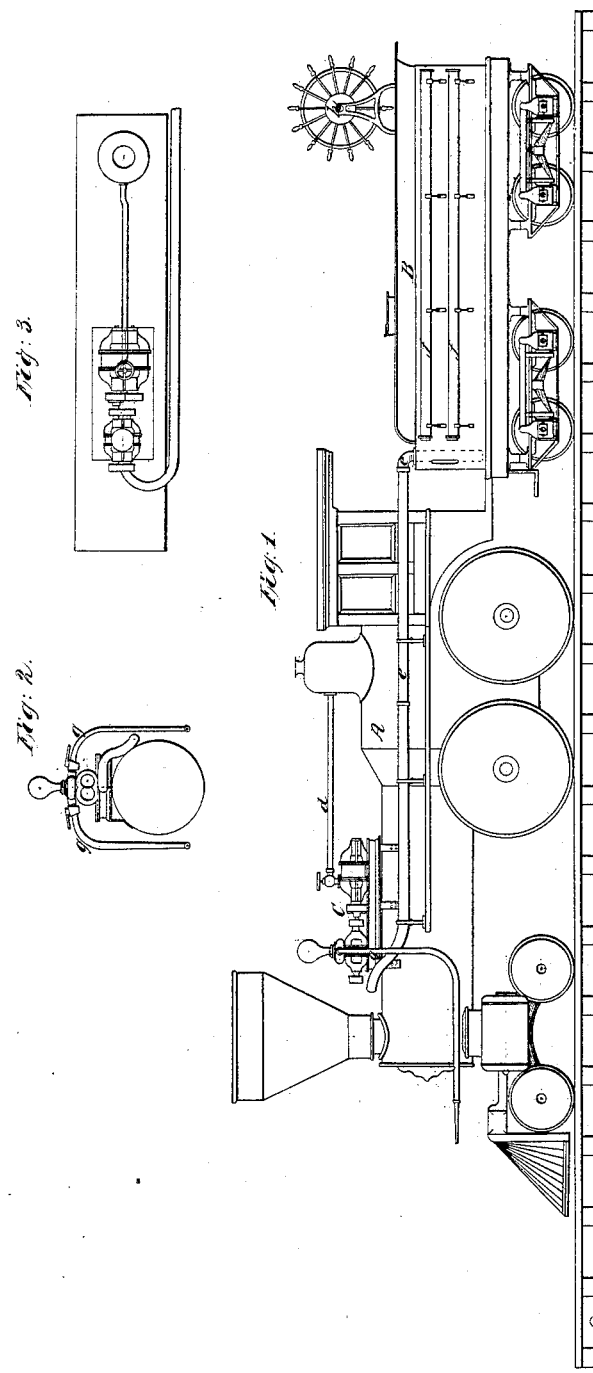

DYER WILLIAMS, OF SYRACUSE, ASSIGNOR TO HIMSELF AND HORACE C. SILSBY, OF SENECA FALLS, NEW YORK.

IMPROVEMENT IN FIRE-ENGINES ON LOCOMOTIVES.

Specification forming part of Letters Patent No. 35,053, dated April 22, 1862.

*To all whom it may concern:*

Be it known that I, DYER WILLIAMS, of Syracuse, county of Onondaga, and State of New York, have invented a new and useful Combination of Fire-Engines with Locomotive-Engines for Railroad Purposes; and I do hereby declare and ascertain my said invention in the following description, referring therein to the accompanying drawings, illustrating said invention, in which—

Figure 1 is a side elevation of a locomotive-engine and tender with the fire-engine combined therewith. Fig. 2 shows an end view of the fire-engine placed upon the boiler, which latter is in section. Fig. 3 is a top plan of a portion of the boiler with the fire-engine thereon.

The same letters of reference are used in all the figures to denote like parts.

Heretofore a great want has been felt in and around the numerous costly buildings and machine-shops of railroads at their various stations of a sufficient means to extinguish fires which, from the very nature of their uses, they are constantly liable to. For this purpose I have combined with the ordinary locomotive-engine used in and about all large railroad-stations for switching off cars and other purposes a fire-engine, so as in no way to impede the efficiency and action of said locomotive in its ordinary service, by which I have an efficient means of extinguishing fires at all times, ready for use within a reasonable distance of any track upon which the engine can be run, with an immediate supply of water in the tank of the engine for sudden emergencies, and a superabundant power always at hand to drive the fire-engine to its utmost capacity as well as to convey it rapidly to the point of action. It is obvious in this combination that no specific style of fire-engine driven by steam, or of locomotive to which it is attached, is essential to the combination which I have sufficiently illustrated in the drawings to enable any competent engineer to apply in any way that convenience or taste may dictate.

In the drawings, A is the locomotive-boiler.

B is the tender, which I prefer to make with a tank larger than ordinary to afford a sufficient supply of water for immediate use to the fire-engine in cases of sudden emergency.

C is the fire-engine placed upon the top of the boiler, and the one shown in the drawings is of the rotary kind patented by Birdsill Holly, February 6, 1855, although I do not mean to confine myself exclusively to this form of engine.

To supply steam to drive the fire-engine I connect it with the dome of the locomotive by a steam-pipe, $d$, by which I give it steam. For the water-supply I carry the suction-pipe $e$ back from the fire-engine to the rear end of the boiler, with permanent fixtures, at which point I have a coupling-joint that connects it with another pipe, $e'$, which enters the top of the water-tank of the tender, and descends nearly to the bottom thereof or any convenient determined distance down. By this arrangement I have a convenient and immediate supply of water, that is at all times carried with the apparatus and can be used until other supplies are obtained. By uncoupling the connection with the tank, suction-hose can be attached to connect with any other reservoir within reach. These additional lengths of suction-hose are carried upon the sides of the tender, as seen at F in Fig. 1. The discharge-pipes $g$ descend from the fire-engine on each side of the boiler, and flexible hose of any length may be connected to them, as in ordinary fire-engines. The exhaust-steam from the fire-engine is conveyed into the smoke-stack, so as to keep up the draft of the fire while the locomotive is at rest to supply the necessary steam for working the fire-engine.

$h$ is a hose-reel on tender B, as shown in Fig. 1.

It is obvious that the fire-engine may be driven by the engine of the locomotive—as, for instance, by raising the driving-wheels of the locomotive and connecting them by a band or gearing with the fire-engine; but all such modes I deem defective, and as they are obvious to any well-instructed engineer a description of details will be unnecessary.

The combination of a fire-engine with a locomotive-engine produces a most efficient instrument for protection and safety from fire, not only of the buildings but also of bridges and other structures along the line of the road for a considerable distance therefrom.

In some instances it may be found advantageous to attach these fire-engines to locomotives drawing freight-trains having combustible matter on board, and, in some instances, even with passenger-trains. This fire-engine may also be used in cases of accident for filling the tank.

Having thus fully described my invention and the purposes to which I intend to apply it, what I claim therein, and desire to secure by Letters Patent, is—

The combination of a fire-engine with a locomotive-engine for railroads, substantially as and for the purposes set forth.

DYER WILLIAMS.

Witnesses:
JOHN STEDMAN,
WILLIAM G. VINCETT.